No. 607,740. Patented July 19, 1898.
T. G. GALLAGHER.
STEAM TRAP AND BOILER FEEDER.
(Application filed Feb. 3, 1898.)

(No Model.) 2 Sheets—Sheet 2.

Witnesses
Edw. A. Duvall, Jr.
Chas. E. Riordon

Inventor
Thomas G. Gallagher
By John A. Donell
His Attorney

UNITED STATES PATENT OFFICE.

THOMAS G. GALLAGHER, OF PHILADELPHIA, PENNSYLVANIA.

STEAM-TRAP AND BOILER-FEEDER.

SPECIFICATION forming part of Letters Patent No. 607,740, dated July 19, 1898.

Application filed February 3, 1898. Serial No. 668,984. (No model.)

*To all whom it may concern:*

Be it known that I, THOMAS G. GALLAGHER, a citizen of the United States, residing at Philadelphia, in the county of Philadelphia and State of Pennsylvania, have invented certain new and useful Improvements in Steam-Traps and Boiler-Feeders; and I do hereby declare the following to be a full, clear, and exact description of the invention, such as will enable others skilled in the art to which it appertains to make and use the same.

The object of the present invention is to provide an improved form of combined steam-trap and automatic feeder for steam-boilers possessing advantages in the matter of simplicity of construction and operation, durability of parts, and efficiency in action. In evolving the invention I have aimed to entirely dispense with valves such as ordinarily employed in steam-traps and which are likely to get out of order, and I have provided for a perfect automatic operation of the device in receiving and delivering water of condensation and in admitting and exhausting live steam by means of the registry of suitably-arranged ports under oscillation of a structure containing chambers in which the water to be fed to the boiler alternately collects and from which it is alternately expelled by steam-pressure.

With the above-stated objects in view the invention consists in a number of novel features of construction and combinations of parts, the essential elements of which are recited in the appended claims and a detailed description of a preferred form of embodiment of which is given hereinafter with reference to the accompanying drawings, forming part of this specification.

Figure 1:
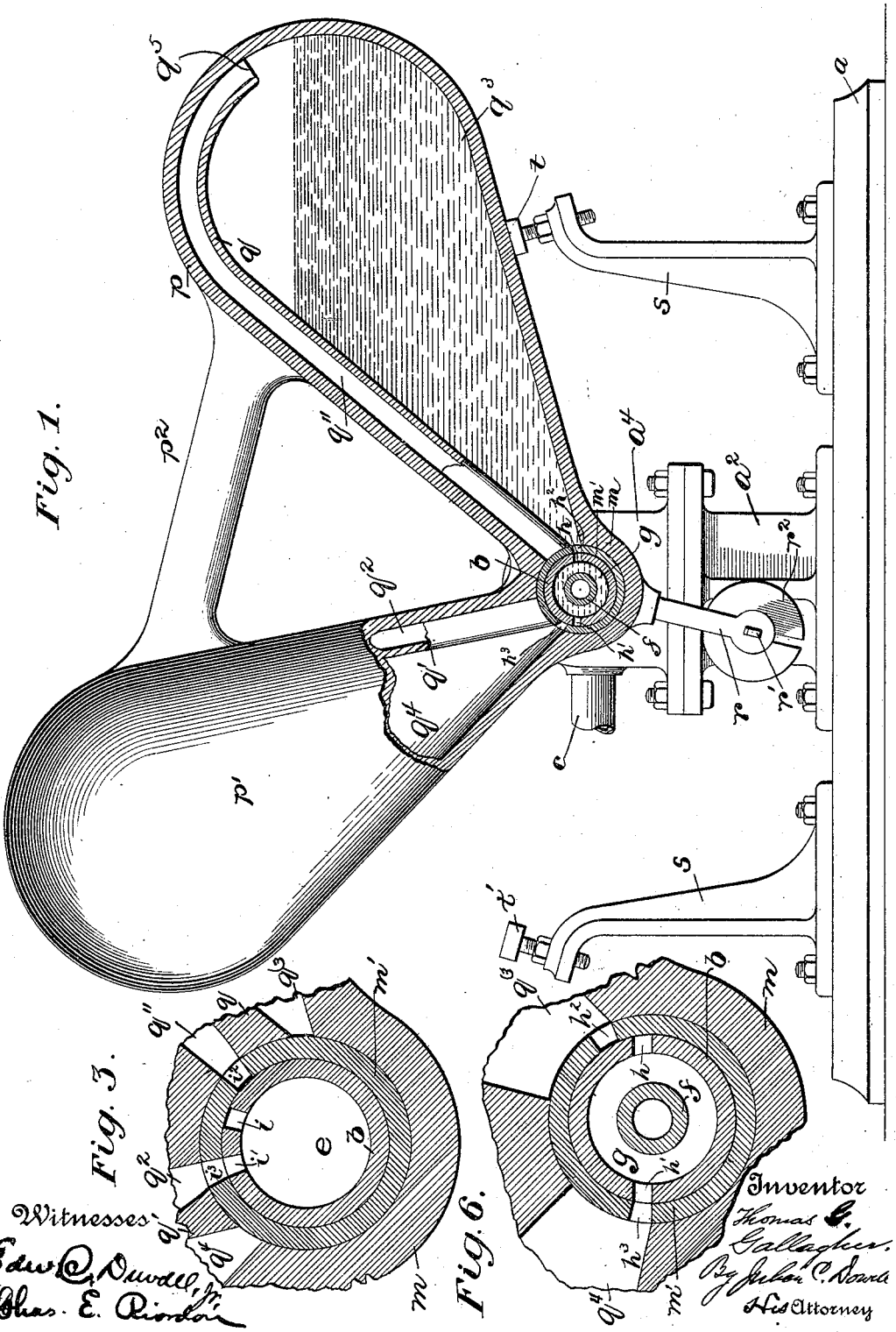
Figure 2:
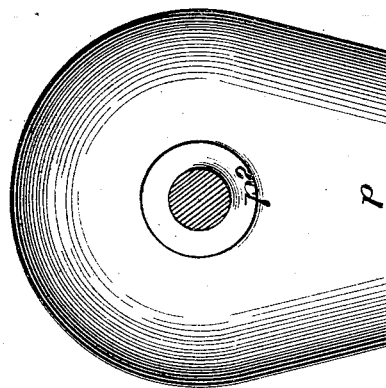
Figure 5:
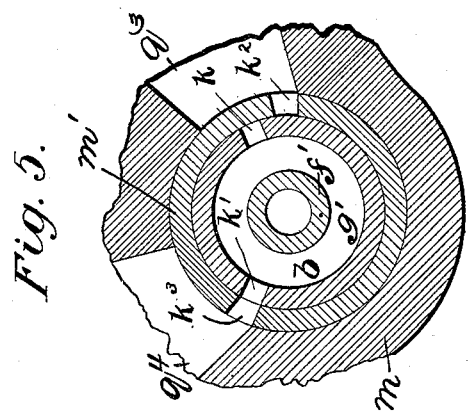
Figure 4:
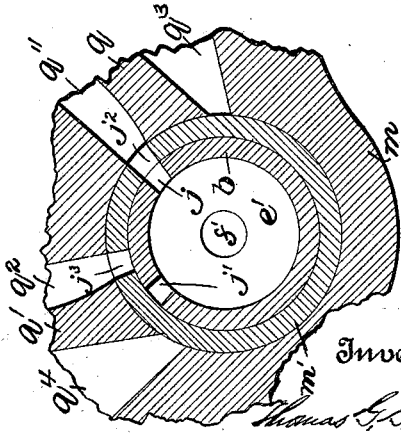

Of said drawings, Figure 1 represents, partially in end elevation and partially in cross-section, an apparatus constructed in accordance with my invention. Fig. 2 represents the apparatus partially in side elevation viewed from the left of Fig. 1 and partially in longitudinal section. Figs. 3, 4, and 5 are cross-sections, on an enlarged scale, taken on the lines III III, IV IV, and V V, respectively, of Fig. 2; and Fig. 6 is a similar cross-section taken on the same line as the central portion of Fig. 1, but representing the parts in the relative positions they assume when the trap has swung to the left, or the opposite position to that it occupies in Fig. 1.

In the drawings the reference-letter $a$ designates a suitable base, upon the upper side of which near the ends are secured standards or pedestals $a'$ and $a^2$, having secured to their upper sides casings or boxes $a^3$ and $a^4$, which are formed on their confronting sides with interiorly-screw-threaded bosses $a^5$ to receive the screw-threaded ends of a hollow shaft $b$. Into one of these boxes $a^4$ leads a pipe $c$, which is designed to convey water of condensation collected from various steam appliances into this box, whence it flows through the hollow shaft to other passages hereinafter described. A pipe $c'$ communicates with the interior of the other box $a^3$ and is designed to convey away water as it is delivered from the trap to the boiler or other steam-generator. The hollow shaft is formed or provided with a central imperforate partition $d$, and with partitions $d'$ and $d^2$ on opposite sides of the same, forming between them and said central partition chambers $e$ and $e'$, with which communicate, respectively, pipes $f$ and $f'$, the latter extending centrally through the hollow shaft $b$ and having screw-threaded portions engaging screw-threaded bosses $f^2$ and $f^3$ on the boxes $a^3$ and $a^4$. The pipe $f'$ conveys live steam into the chamber $e'$, which live steam is admitted at intervals to the trap for purposes hereinafter explained, and the other pipe $f$ is designed to provide an exhaust for the steam which has been used in the trap, this pipe opening into the atmosphere. It will thus be seen that the interior of the shaft $b$ is divided into four compartments, two of which, hereinbefore designated as $e$ and $e'$, are for steam and the other two of which, $g$ and $g'$, are for water.

The shell of the tubular shaft is formed with a pair of ports for each one of the above-mentioned chambers, and the two ports communicating with the chamber $g$ are designated, respectively, by the letters $h$ and $h'$, Figs. 1 and 2, while the two ports communicating with the chamber $e$ are designated $i$ and $i'$, Figs. 1 and 3, respectively, and the two ports communicating with the chamber $e'$ are designated $j$ and $j'$, Figs. 1 and 4, and the two ports communicating with the chamber $g'$ are designated $k$ and $k'$, Figs. 1 and 5.

Upon the shaft $b$ there is journaled an integral structure having a central sleeve or boss $m$, which embraces the shaft, a bushing $m'$ being interposed, but adapted to oscillate with said sleeve, and the said bushing projecting beyond the sleeve or boss and being screw-threaded at its ends for the reception of packing-glands $n$, which form, with the ends of said bushing, stuffing-boxes in which packing material is introduced to effect a steam-tight closure between the bushing and the shaft. The sleeve or hub $m$ is engaged in any suitable manner with the bushing, so as to cause the two parts to rotate together, and is held from longitudinal movement on the bushing by screw-threaded rings or nuts $o$, engaging the screw-threads in the bushing and bearing against the ends of the sleeve. The bushing $m'$ is prevented from moving longitudinally on the shaft by any suitable means, and is formed with four pairs of ports for registry, respectively, with the ports formed in the hollow shaft, and these ports in the bushing are designated $h^2$ and $h^3$, $i^2$ and $i^3$, $j^2$ and $j^3$, and $k^2$ and $k^3$, and they are so located as to alternately register with the ports in the shaft under oscillations of the bushing—that is to say, under one position of the bushing the ports $h^2$, $i^3$, $j^2$, and $k^3$ will register, respectively, with the ports $h$, $i'$, $j$, and $k'$, whereas in the opposite position of the bushing the ports $h^3$, $i^2$, $j^3$, and $k^2$ will register, respectively, with the ports $h'$, $i$, $j'$, and $k$.

The oscillatory structure above referred to comprises a pair of bulb-like bowls $p$ and $p'$, whose contracted ends unite with the boss or sleeve $m$, the said bowls diverging as they extend upwardly from the latter and their upper or outer portions being connected by a web $p^2$. These bowls or receptacles are substantially pear-shaped, and within them there are formed webs $q$ and $q'$, extending along the upper walls of the receptacles from the small ends of the latter to the middle of the enlarged outer portions thereof, the said webs forming passages $q''$ and $q^2$, which open downwardly into the chambers $q^3$ and $q^4$ of the receptacle, as shown at $q^5$. Each of these passages is in communication with two of the ports in the bushing $m'$, the passage $q''$ communicating with the ports $i^2$ and $j^2$ and the passage $q^2$ communicating with the ports $i^3$ and $j^3$. The chambers $q^3$ and $q^4$ also communicate with ports in the bushing $m'$, the chamber $q^3$ communicating with the ports $h^2$ and $k^2$ and the chamber $q^4$ communicating with ports $h^3$ and $k^3$.

Arms $r$, projecting from the under side of the boss $m$ at opposite ends of the same, support between them a rod $r'$, upon which is mounted a counterbalance in the form of an appropriate number of disks $r^2$.

Standards $s$ are erected on the base $a$ at opposite sides of the shaft $b$ and at some distance therefrom, these standards supporting at their upper ends adjustable rests $t$ and $t'$ for the bowls $p$ and $p'$ to encounter when oscillated.

The operation of the apparatus is as follows: Assuming the right-hand bowl or receptacle $p$, Fig. 1, to be lying against the rest $t$, the ports $h$ and $h^2$ register, so that water collected within the bowl $p$ may flow out of the same into the chamber $g$, and thence through the box $a^3$ into the pipe $c'$, which conveys such water to the steam-generator or other appropriate place of delivery. Under the above-stated adjustment of parts the port $j^2$ registers with the port $j$, so that live steam may pass from the chamber $e'$ into the passage $q''$ and be discharged from the same at the point $q^5$ upon the surface of the water in the chamber $q^3$, so as to expel such water from the latter. At the same time the ports $k'$ and $k^3$ register, so that water entering through the box $a^4$ and chamber $g'$ has access to the interior of the left-hand bowl $p'$, and the ports $i'$ and $i^3$ register, so that steam previously employed to expel water from the bowl $p'$ may exhaust through the chamber $e$ and pipe $f$. When water has collected in the bowl $p'$ in sufficient quantity to overbalance the weight on the other side of the shaft, the oscillatory structure tilts to the left until the bowl $p'$ encounters the rest $t'$, and then the ports $h'$ and $h^3$ register, as shown in Fig. 6, for the discharge of water from the bowl $p'$ into the chamber $g$, and ports $j'$ and $j^3$ register for the inlet of live steam to expel the water from the bowl $p'$. At the same time the ports $k$ and $k^2$ are brought into alinement, so that water may feed into the bowl $p$, and the ports $i$ and $i^2$ are brought into alinement, so that steam may exhaust from said bowl.

It will be seen that the above-described construction provides a practical way of collecting water of condensation and supplying the same at regular intervals to a steam-generator, the whole operation being automatic and the construction and arrangement of parts being so simple as to reduce to a minimum liability of derangement. It will be readily seen that this construction entirely fulfils the objects primarily stated. However, it is to be understood that the invention is capable of embodiment in other forms than that here shown, and therefore the claims which follow are not restricted to any one specific form of embodiment of the invention.

Having thus fully described my invention, what I claim as new, and desire to secure by Letters Patent of the United States, is—

1. The combination of a stationary hollow shaft having a number of transverse partitions dividing its interior into four separate compartments each provided with a pair of ports, water-conduits communicating with two of said compartments, steam-conduits communicating with the other two of said compartments, and an oscillatory structure mounted upon the hollow shaft and comprising water-receptacles each ported for alternate registry with the ports of a different one of the water-compartments of the hollow shaft, and steam-passages opening into the outer portions of the said water-receptacles respectively, and each ported for alternate registry with the ports of a different one of the steam-compartments of said hollow shaft, substantially as described.

2. In a steam-trap, the combination of a hollow shaft having a central imperforate partition and other partitions on opposite sides of the latter, dividing the interior of the shaft into separate chambers, the shaft having a pair of ports for each of the chambers; supply and exhaust steam pipes extending within the shaft and communicating respectively with the chambers separated by the central partition; water-pipe connections coupled to the ends of the hollow shaft; an oscillatory structure journaled on the shaft and comprising a pair of divergent bowls each having a water-chamber with ports to register alternately with ports of different chambers of the hollow shaft, and having a steam-passage with ports to register alternately with ports of other chambers of said hollow shaft; and suitable rests to limit the movements of the bowls.

In testimony whereof I affix my signature in presence of two witnesses.

THOMAS G. GALLAGHER.

Witnesses:
MOSES B. MACLAY,
JOSEPH MCKINNEY.